UNITED STATES PATENT OFFICE.

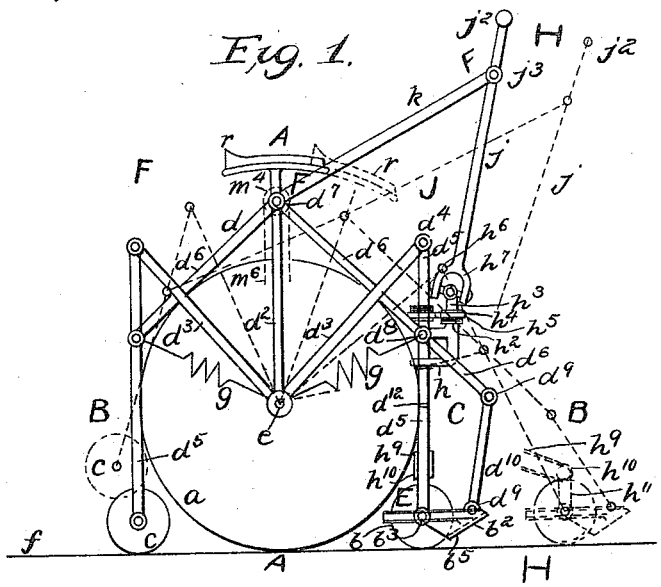
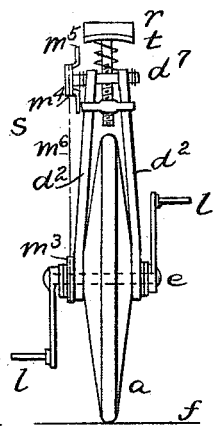
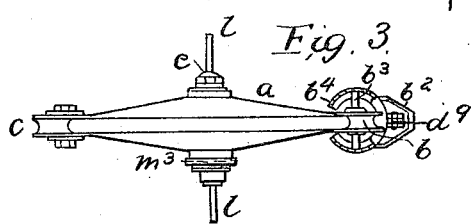
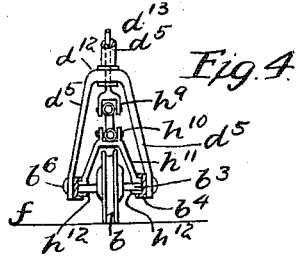
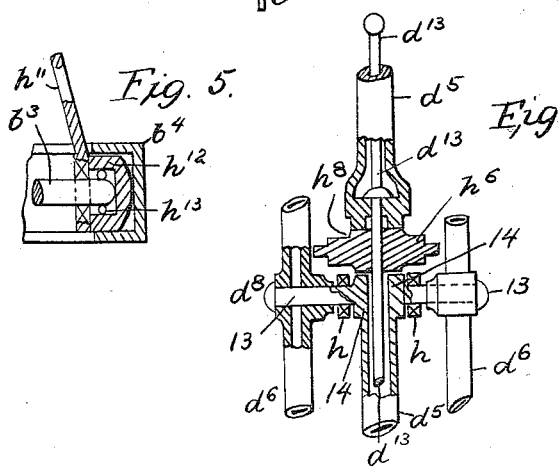
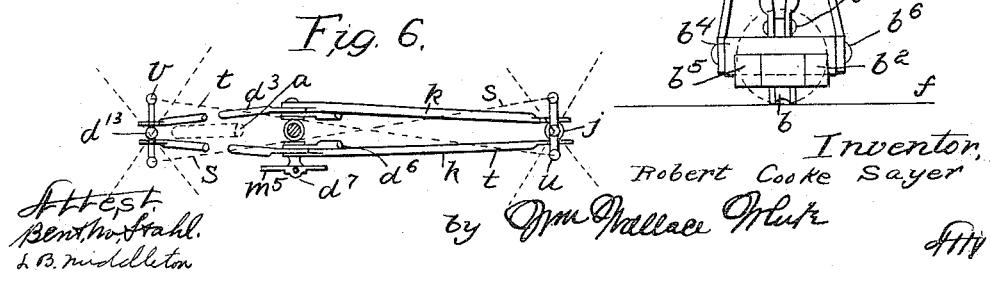

ROBERT COOKE SAYER, OF BRISTOL, ENGLAND.

VEHICLE.

979,572.   Specification of Letters Patent.   Patented Dec. 27, 1910.

Application filed August 10, 1908. Serial No. 447,863.

*To all whom it may concern:*

Be it known that I, ROBERT COOKE SAYER, a subject of the King of Great Britain and Ireland, residing at 11 Clyde road, Redland, Bristol, England, have invented certain new and useful Improvements in Vehicles, of which the following is a specification.

The object of the present invention is a vehicle having a short base automatically varied, and increased when the load tends to fall forward or backward, and essentially consists of a main wheel, in duplicate or not, and two smaller wheels connected by a hinged frame to carry the vehicle, so that when the vehicle frame tends to fall forward or backward it automatically actuates one of the latter wheels against a spring by a lever, to increase its base in the direction of the fall; enabling the front wheel and the back wheel to steer the vehicle in the same direction when actuated by a handle, wheels, a chain and hinges; and when desired on the front wheel a shoe hinged to its axle, connected at its toe to the frame by a strut to keep it parallel to the surface traversed to slide and rise with the wheel over obstructions.

The invention is set out by the specification and drawings where—

Figure 1 shows an elevation of the vehicle in its normal position by full lines, and in another position by dotted lines. Figs. 2, 3 and 4 show sectional elevations at A—A; B—B; C—C, Fig. 1. Fig. 5 shows in part, a sectional elevation at E—E, Fig. 1. Fig. 6 shows a sectional plan at F—F, Fig. 1. Fig. 7 is a sectional view on line H—H of Fig. 1. Fig. 8 shows a sectional elevation in part, at J—J Fig. 1.

In reference to the drawings:—$a$ shows the main wheel which when desired is duplicated; $b$ the front wheel with its shoe $b^2$ hinged to its axle $b^3$ by the annular member $b^4$, $c$ the back wheel, each wheel being connected to the vehicle $r$ by a frame $d$ consisting of vertical members $d^2$ pivoted on the axle $e$ of the wheel $a$, struts $d^3$ hinging on axle $e$ and at $d^4$ pivoted to levers $d^5$, struts $d^6$ pivoted on members $d^2$ at $d^7$ and on levers $d^5$ at $d^8$. Members $d^5$ and $d^6$ are held back by springs $g$ secured at one end to the axle $e$; the shoe $b^2$ of the wheel $b$ is kept parallel to the surface $f$ by an extension of the strut $d^6$ connected to it by hinges $d^9$ and struts $d^{10}$, whereby the inclined plate $b^5$ will meet obstructions on the surface $f$ when rough, and thus raise the wheel $b$ over them and enable said wheel to be of small diameter, but on smooth surfaces $f$ the plate may be omitted.

The hinge $d^8$ on the member $d^5$, Fig. 8, is formed with trunnions 13 on a collar 14 so as to carry one end of a part $h$ the other end resting on member $d^5$ to keep it parallel. The part $h$ is swiveled at $h^2$, Fig. 7, to a part $h^3$ having a gear wheel $h^4$ with which meshes a chain $h^5$, which also meshes with a wheel $h^6$ keyed on a rod $d^{13}$, Fig. 8 and passing through member $d^5$ and connecting and supporting its two parts. The lower end of rod $d^{13}$ is connected to a stirrup $h^{11}$ by hinges $h^9$ and $h^{10}$ and the ends of said stirrup surround the ends of the axle $b^3$ of the wheel $b$.

$h^{12}$ is a slide guide in the annular member $b^4$ into which the ends of the axle $b^3$ project and $h^{13}$ are balls located between these parts. Thus it will be seen that the wheel $b$ can be turned relatively to the wheel $a$ by actuating the handle bar stem $j$ in the joint $j^3$, said stem being connected with the part $h^3$ by the hinge $h^7$. The lower end of member $d^5$ is formed with a stirrup which connects the member $b^4$, Fig. 4, by bolts $b^6$.

The wheel is guided by wheels $b$ or $c$ from the handle bar $j^2$, by means which are omitted from Fig. 1 for clearness; but shown by Fig. 5 and consisting of cross cords $s$, $t$, having springs, not shown, to allow variation in length and able to be slackened, passing through the collar of the hinge $d^7$, Fig. 2, and connecting cross bars $u$ on the shaft $j$, Fig. 1, below hinge $j^3$ and rods $v$ on the rod $d^{13}$ which passes through the lever $d^5$ to a point above the hinge $d^4$, and connects with the wheel $c$ in the same manner as does rod $d^{13}$, the wheel $b$ though omitting the shoe $b^2$; so that wheels $c$ and $b$ in all their positions as shown full, or dotted, are actuated together by the handle bar $j^2$ but at reversed angles so that the steering of the wheel $a$ may be done by either when wheels $b$ and $c$ are on the surface $f$ and both steer, or when wheels $b$ or $c$ are raised and the other only steers.

The wheel $a$ is rotated by means of the cranks $l$ secured to the axle $e$ and the vehicle $r$ is steered by actuating the bar $j^2$ to rotate the strut $j$, hinge $h^7$, part $h^3$, swivel $h^2$, wheels $h^4$, $h^6$, chain $h^5$, rod $d^{13}$, hinges $h^9$ $h^{10}$, stirrup $h^{11}$, slide $h^{12}$, the axle $b^3$ in the member $b^4$ and wheel $b$; and the wheel $c$ similarly by the bars $u$, $v$ and cords $s$, $t$. When the vehicle frame $r$ tends to fall, say forwardly, the several parts go more or less to the positions shown in dotted lines in Fig. 1, and increases the length of base $a$ to $b$ on the surface $f$ in the direction of the fall by the strut $d^6$ acting on the lever $d^5$ at $d^8$ against the spring $g$ while the axle $e$ and $d^3$ hold it at $d^4$, thus thrusting the wheel $b$ from the wheel $a$ the action being an automatic one; the same obtains with the wheel $c$ when the vehicle frame $r$ tends to fall backward.

I claim:—

1. A vehicle comprising a main wheel, a seat supporting member carried thereby, a supplemental wheel contacting with the road, a system of pivoted levers connecting said supplemental wheel with the said member so that said supplemental wheel may be moved away from the main wheel and yielding means for holding said supplemental wheel in its normal position adjacent the main wheel.

2. A vehicle comprising a main wheel, a seat supporting member carried thereby, front and rear wheels contacting with the road, a system of pivoted levers connecting each of the latter wheels with the seat supporting member so that said wheels may have movement away from the main wheel, and yielding means for holding said wheels in their normal position adjacent said main wheel.

3. A vehicle comprising a main wheel, a seat supporting member carried thereby, front and rear wheels contacting with the road, a system of pivoted levers connecting each of the latter wheels with the seat supporting member so that said wheels may have movement away from the main wheel, yielding means for holding said wheels in their normal position adjacent said main wheel, and steering means connected with the front wheel.

4. A vehicle comprising a main wheel, a seat supporting member pivoted to the hub of said wheel, vertical members $d^5$, front and rear wheels carried by said members, struts $d^3$ pivotally connected at their upper ends to the upper ends of the members $d^5$ and having their lower ends pivoted to the hub of the main wheel, struts $d^6$ pivoted at one end to the members $d^5$ and at their other ends to the upper portion of the seat supporting member, means for steering the front wheel and springs connecting the vertical members $d^5$ with the hub.

5. A vehicle comprising a main wheel, a seat supporting member carried thereby, a supplemental wheel, a shoe carried by said supplemental wheel, a system of pivoted struts connecting said wheel and shoe with the seat supporting member so that said wheel and shoe may have movement relatively to the main wheel, spring means for holding the wheel and shoe in normal position, and steering means connected with the supplemental wheel.

In testimony whereof I have affixed my signature, in presence of two witnesses.

ROBERT COOKE SAYER.

Witnesses:
 J. PERRY WORDEN,
 GEORGE T. PITCHER.